F. I. & B. P. REMY & A. BERGER.
DIFFERENTIAL SPEED CHANGING MECHANISM.
APPLICATION FILED DEC. 13, 1912.

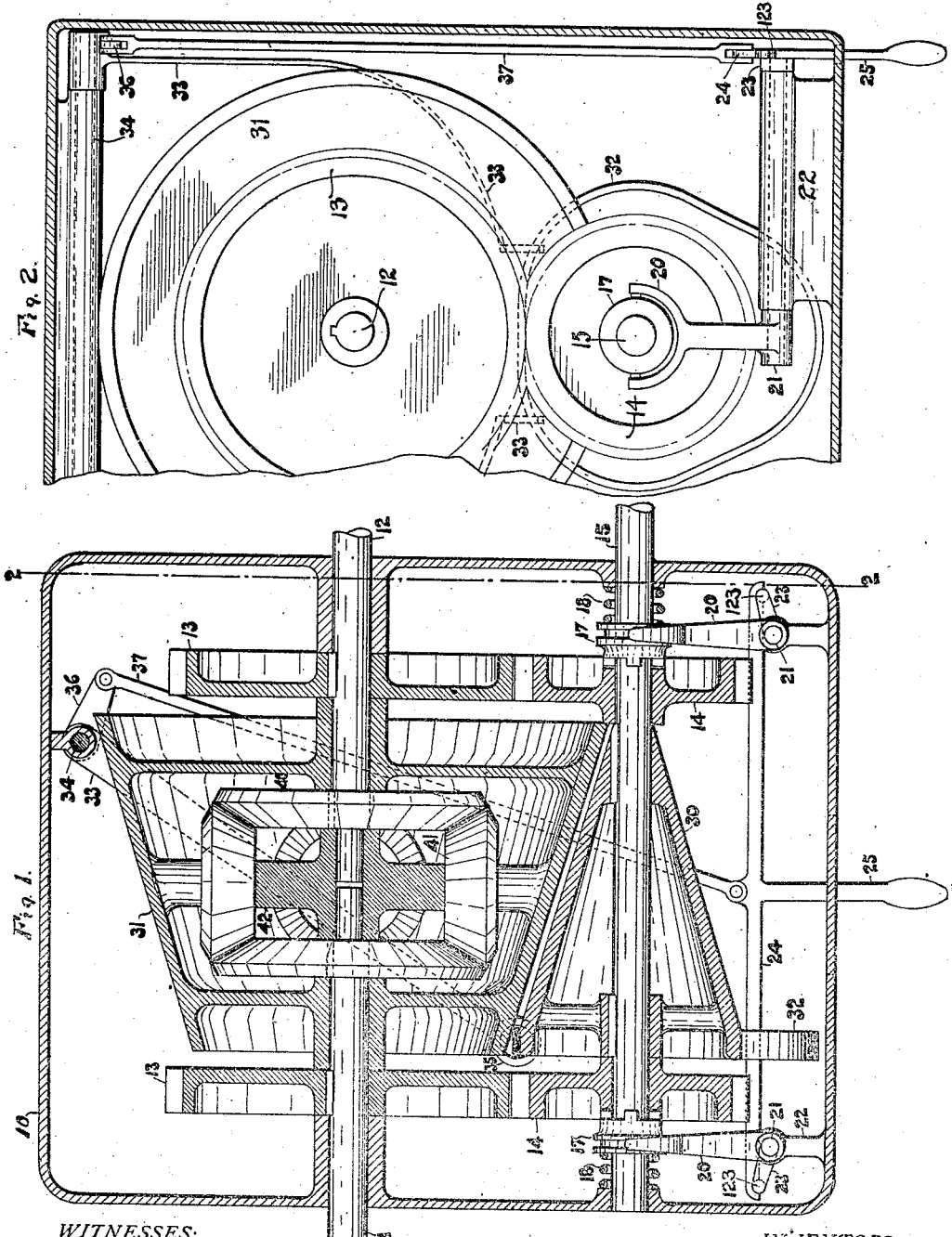

1,069,182.

Patented Aug. 5, 1913.

WITNESSES:
A. H. Edgerton
Orpha M. McLaughlin

INVENTORS.
BENJAMIN P. REMY,
FRANK I. REMY AND
ARTHUR BERGER
BY
V. H. Lockwood
ATTORNEY.

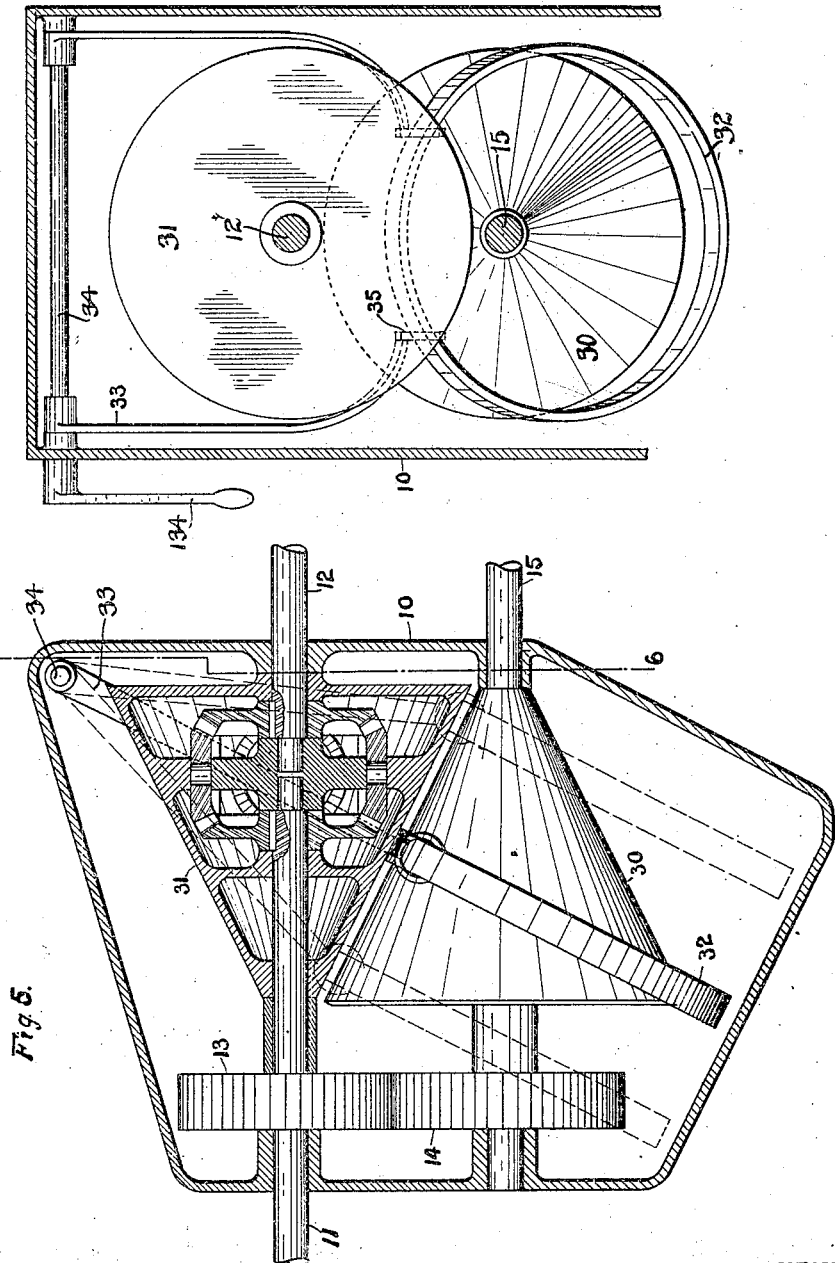

UNITED STATES PATENT OFFICE.

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

DIFFERENTIAL SPEED-CHANGING MECHANISM.

1,069,182.  Specification of Letters Patent.  Patented Aug. 5, 1913.

Application filed December 13, 1912. Serial No. 736,524.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Differential Speed-Changing Mechanism; and we do hereby declare that the following is a full, clear, and exact description thereof, reference being had to the accompanying drawings, in which like letters refer to like parts.

The object of this invention is to provide mechanism for varying the relative speeds of two shafts.

The invention has been made with particular reference to use in connection with traction engines, automobiles and like vehicles, for steering or turning the same through the drive wheels thereof by varying the speeds of the shafts which drive said wheels. In this invention there is a differential gear mechanism in connection with said shafts, and means provided for changing the speed of said gear, and additional means for transmitting power from each of said shafts and parts arranged so that, when it is desired to change the speed of said shafts, one of the direct driving means is thrown out of operation so that only one shaft is driven directly and the other shaft is driven through the differential gearing and the speed thereof regulated by changing the speed of rotation of the differential gearing. When the mechanism is operated straight ahead, the differential gearing is not utilized and it is used only for changing speed.

The nature of the invention will be understood from the accompanying drawings and the following description and claims.

In the drawings, Figure 1 is a horizontal section through the power transmitting mechanism, the ends of the shafts being broken away and the parts shown so as to drive both shafts at equal speed. Fig. 2 is a transverse section on the line 2—2 of Fig. 1, parts being broken away. Fig. 3 is a section through the casing to one side of the shafts and showing the mechanism within the casing in elevation and with the parts arranged so as to drive the left-hand shaft directly and the right-hand shaft through the differential gearing at slower speed. Fig. 4 is the same as Fig. 3, with parts reversed so that the right-hand shaft is driven directly and the left-hand shaft is driven at slower speed. Fig. 5 is a central horizontal section through a modified form of the mechanism, one cone pulley being in elevation and showing only one set of gears. Fig. 6 is a section on the line 6—6 of Fig. 5, with the lower part of the casing broken away.

In the drawings there is shown a frame or housing 10 in which the driven shafts 11 and 12 are mounted in alinement with each other and on each shaft there is secured a spur gear 13 which meshes all of the time with a spur gear 14 loosely mounted on the driving shaft 15, the right-hand end of which is broken away, but power is transmitted to it from some suitable source. The gears 14 are clutched with the driving shaft 15 by sliding clutches 17 on the shaft 15 which are spring actuated by the springs 18 surrounding said shaft and lying between the housing and the clutch. The clutches are disengaged from the gears by the clutch levers 20 which are secured on shafts 21 mounted in bearings 22 connected with the frame, each shaft having secured to it an arm 23 carrying on its outer end a transverse rod 123 upon which the recessed end of a shifting bar 24 rests. Said shifting bar has secured to it a handle 25 so that the bar can be rocked and when rocked to the left, as shown in Fig. 3, the bar 24 will cause the disengagement of the right-hand clutch, but the other end of the bar 24 will disengage the rod 123 on the arm 23 and then the spring 18 will throw the left-hand clutch into engagement with the gear 14. When the handle 25 is rocked to the right, as shown in Fig. 4, the opposite result follows.

Upon the driving shaft between the gears 14 there is secured a cone friction pulley 30 having at its largest point a truly cylindrical portion. There is an inversely arranged conical pulley 31 loosely mounted on the two shafts 11 and 12 enveloping their juncture and adapted to be driven by the cone pulley 30 through the intervention of a belt 32 which is movable or adjustable between said cone pulleys by the shifting arms 33 secured on a shaft 34 mounted in the housing, as shown in Fig. 2, and which at their inner ends have rings 35 which surround the belt 32 and whereby the same is held and shifted. On the shaft 34 there is a short arm 36 connected by a link 37 with the shifting bar 24. The result is that when the shifting bar 24 is turned to the right, said shifting bars 23 will move the belt 32 from the idle position, shown in Fig. 1, to any desired position between the cone pulleys.

The differential gearing is carried by the cone pulley 31, there being a beveled gear 40 on the end of each shaft 11 and 12 and a number of beveled pinions 41 mounted in connection with the inner wall of the cone pulley which is hollow and the abutting ends of the shafts 11 and 12, as well as the pinions 41, are mounted in connection with a suitable block 42 as is common in construction of differential gearing.

While driving straight ahead or driving the two shafts 11 and 12 at the same speed, the cone pulleys and differential gearing are idle, the belt 32 being in the position indicated in Fig. 1, at the left-hand end of said pulleys, and the gears 13 and 14 intermeshing and directly driving the shafts 11 and 12 from the driving shaft 15. By operating the hand or controlling lever 25 so as to throw the right-hand clutch 17 out of engagement with its gear 14, the left-hand shaft 11 will be directly driven, and the belt 32 being at the same time moved in between pulleys, as shown in Fig. 3, the cone pulleys 31 carrying differential gearing will be actuated and will transmit a reduced speed to shaft 12 from the shaft 11 which is being directly actuated, so that the left-hand shaft will be driven faster than the other end and if it be connected with the driving wheels of a vehicle, the latter will be caused to be turned or steered to the right. The relative speeds of the two shafts may be varied according to the position of the belt 32 between the cone pulleys. As the speed of the cone pulley 32 diminishes, the speed of the shaft 12 will correspondingly decrease and vice versa. On the other hand, if the lever 25 be operated, as shown in Fig. 4, the reverse will take place, the right-hand shaft 12 being directly driven and the shaft 11 driven through the differential gearing at a slightly lower speed as the belt 32 is shifted quite far to the left where the diameters of the cones are almost equal.

In the modified forms shown in Figs. 5 and 6, only one set of gears 13 and 14 are employed, and, therefore, the left-hand shaft 11 is driven from the driving shaft 15 constantly and the other shaft 12 is varied in its speed by the differential gearing, said differential gearing being varied in its speed by the cone pulleys 31 and 30. When the belt 32 is where it is shown by full lines in Fig. 5, the two shafts 11 and 12 will be driven at the same speed as at that point the diameters of the two cone pulleys are equal. If the belt be shifted to the left to the dotted line position, the shaft 12 will be correspondingly increased in speed, and if the belt be shifted to the right, said shaft 12 will be correspondingly reduced in speed.

We claim as our invention:

1. A pair of shafts in alinement with each other, a differential gearing mounted in connection with the same, independent means for driving one of said shafts, and means for varying the speed of the differential gearing whereby one shaft will be driven from the other and at a variable speed.

2. A pair of shafts in alinement with each other, means for driving each shaft, means for throwing either of said shaft driving means out of operation, a differential gearing mounted in connection with said shafts, and means for varying the speed of said differential gearing whereby either of said shafts may be driven from the other and the speed varied.

3. A pair of shafts in alinement with each other, a parallel driving shaft, intervening gears on each of said driven shafts and said driving shaft, one gear of each pair being loosely mounted, a clutch for clutching the loosely mounted gear on its shaft, means for controlling said clutches so that either or both may be moved into or out of clutching position, a differential gearing in connection with said driven shafts, and means for varying the speed of said differential gearing.

4. A pair of shafts in alinement with each other, a parallel driving shaft, intervening gears on each of said driven shafts and said driving shaft, one gear of each pair being loosely mounted, a clutch for clutching the loosely mounted gear on its shaft, a differential gearing in connection with said driven shafts, and means for simultaneously throwing one of said clutches out of operation and said differential gearing into operation and vice versa.

5. A driving shaft, a pair of driven shafts in alinement with each other, a differential gearing connecting them, gears for directly driving one of said driven shafts from the driving shaft, and means actuated by the driving shaft for driving the differential gearing, said means being arranged so that the speed thereof may be varied.

6. A driving shaft, a pair of driven shafts in alinement with each other, a differential gearing connecting them, gears for directly driving one of said driven shafts from the driving shaft, a cone pulley for driving the differential gearing, a reverse cone pulley on the driving shaft, and variable means for varying the speed of the differential gearing.

7. A driving shaft, a pair of driven shafts in alinement with each other, a differential gearing connecting them, gears for directly driving one of said driven shafts from the driving shaft, a cone pulley for driving the differential gearing, a reverse cone pulley on the driving shaft, a belt operating between said cones, and means for shifting said belt for varying the speed of said differential gearing.

8. A driving shaft, a pair of driven shafts in alinement with each other, means for driving each driven shaft directly from the driving shaft, a differential gearing connecting the two driven shafts, means for driving said differential gearing, and means for simultaneously throwing either of said direct driving means out of operation and throwing the differential gearing driving means into operation.

9. A driving shaft, a pair of driven shafts in alinement with each other, means for driving each driven shaft directly from the driving shaft, a differential gearing connecting the two driven shafts, means for driving said differential gearing, and means for simultaneously throwing both of said driving means into operation and said differential gearing driving means out of operation.

10. A driving shaft, a pair of driven shafts in alinement with each other, means for driving each driven shaft directly from the driving shaft, a differential gearing connecting the two driven shafts, means for driving said differential gearing, a clutch for throwing each direct driving means into and out of operation, and means for simultaneously throwing both clutches into operation and said differential gearing driving mechanism out of operation.

11. A driving shaft, a pair of driven shafts in alinement with each other, means for driving each driven shaft directly from the driving shaft, a differential gearing connecting the two driven shafts, means for driving said differential gearing, a clutch for throwing each direct driving means into and out of operation, and means for simultaneously throwing one of said clutches into operation and the other clutch out of operation and the differential gearing driving means into operation.

12. A driving shaft, a pair of driven shafts in alinement with each other, means for driving each driven shaft directly from the driving shaft, a differential gearing connecting the two driven shafts, means for driving said differential gearing, a clutch for throwing each direct driving means into and out of operation, springs for throwing said clutches into operation, a bell crank lever for throwing each clutch out of operation, a rocking bar for actuating each of said bell crank levers, a handle for rocking said bar, and means connected with said bar for throwing the differential gearing driving mechanism into operation when either of said clutches is thrown out of operation.

13. A driving shaft, a pair of parallel driven shafts in alinement with each other and parallel with the driving shaft, a differential gearing connecting the two driven shafts, a cone pulley for actuating said gearing, a reverse cone pulley on the driving shaft, a shifting belt between said cone pulleys for transmitting power from the pulley on the driving shaft to the pulley on the differential gearing, a bell crank lever for shifting said belt from an operative to an inoperative position or the reverse, gearing for directly driving one of said driven shafts from the driving shaft, a clutch for throwing either of said sets of gears out of and into operation, a spring for forcing each clutch into operative position, a bell crank lever for forcing each clutch out of operative position, a rocking bar for actuating either clutch lever, and a connecting rod between said rocking bars and the bell crank for shifting said belt arranged so that when either clutch is thrown out of operation, the belt will be moved into operative position and when both clutches are in operative position, said belt will be in inoperative position.

In witness whereof, we have hereunto affixed our signatures in the presence of the witnesses herein named.

FRANK I. REMY.
BENJAMIN P. REMY
ARTHUR BERGER.

Witnesses:
W. B. POLAND,
RUTH I. MILLER.